(12) United States Patent
Denison

(10) Patent No.: US 7,416,641 B2
(45) Date of Patent: Aug. 26, 2008

(54) APPARATUS FOR RECOVERING MARKETABLE PRODUCTS FROM SCRAP RUBBER

(75) Inventor: Gilbert W. Denison, Norman, OK (US)

(73) Assignee: Federal Recycling Technology, Inc., Norman, OK (US)

( * ) Notice: Subject to any disclaimer, the term of this patent is extended or adjusted under 35 U.S.C. 154(b) by 115 days.

(21) Appl. No.: 09/968,434

(22) Filed: Oct. 1, 2001

(65) Prior Publication Data

US 2002/0117388 A1 Aug. 29, 2002

Related U.S. Application Data

(60) Provisional application No. 60/236,519, filed on Sep. 29, 2000.

(51) Int. Cl.
 *C10B 21/20* (2006.01)
(52) U.S. Cl. .................. 202/99; 202/100; 201/25
(58) Field of Classification Search .......... 422/150, 422/154; 201/3, 4, 13, 25; 202/99, 202, 202/206, 100; 585/241
 See application file for complete search history.

(56) References Cited

U.S. PATENT DOCUMENTS

| | | | | |
|---|---|---|---|---|
| 4,123,332 A | | 10/1978 | Rotter | |
| 4,250,158 A | * | 2/1981 | Solbakken et al. | 423/449.6 |
| 4,284,616 A | * | 8/1981 | Solbakken et al. | 423/449.7 |
| 4,308,103 A | | 12/1981 | Rotter | |
| 4,402,791 A | * | 9/1983 | Brewer | 202/97 |
| 4,740,270 A | | 4/1988 | Roy | |
| 4,746,406 A | * | 5/1988 | Timmann | 201/25 |
| 5,057,189 A | * | 10/1991 | Apffel | 202/113 |
| 5,087,436 A | * | 2/1992 | Roy | 423/449.7 |
| 5,157,176 A | * | 10/1992 | Munger | 585/7 |
| 5,167,772 A | * | 12/1992 | Parker, Sr. | 202/105 |
| 5,198,018 A | * | 3/1993 | Agarwal | 75/401 |
| 5,208,401 A | * | 5/1993 | Roy | 585/1 |
| 5,304,576 A | * | 4/1994 | Martinez | 521/41 |
| 5,435,890 A | * | 7/1995 | Munger | 202/93 |
| 5,636,580 A | * | 6/1997 | Kanis | 110/257 |
| 5,728,361 A | * | 3/1998 | Holley | 423/449.6 |

(Continued)

FOREIGN PATENT DOCUMENTS

WO WO 01/44405 6/2001

*Primary Examiner*—N. Bhat
(74) *Attorney, Agent, or Firm*—James F. Harvey, III; Doerner, Saunders, Daniel & Anderson, LLP

(57) ABSTRACT

Tire pyrolysis systems and processes are provided which include feeding tire shreds to a pyrolysis vessel (40) and pyrolyzing the shreds in a pyrolysis vessel (40) to produce a pyrolysis gas and carbon black mixture. The pyrolysis gas processed by centrifugally separating entrained particles therefrom, separating the pyrolysis gas into a hydrocarbon condensate and a light vapor, removing entrained hydrocarbon condensate from the light vapor, and purifying and refining the hydrocarbon condensate. The carbon black mixture is processed by pulverizing the mixture to break up all strands and clumps of inorganic solids, cooling the carbon black mixture, separating the gross contaminants from the carbon mixture, and purifying and refining the carbon black. The hydrocarbon condensate is purified and refined by removing all remaining contaminants, removing any polycyclic aromatics to produce a clear, colorless plasticizer oil. The carbon black is purified and refined by pulverizing it into a powder, removing all remaining particulate contaminants, optionally pelletizing the carbon black, and bagging or packaging it for shipping.

16 Claims, 5 Drawing Sheets

U.S. PATENT DOCUMENTS

| | | | |
|---|---|---|---|
| 5,735,948 A * | 4/1998 | Cha et al. ................... 106/724 |
| 5,783,046 A * | 7/1998 | Flanigan ...................... 201/25 |
| 5,820,736 A * | 10/1998 | Bouziane et al. ............ 202/136 |
| 5,821,396 A * | 10/1998 | Bouziane .................... 585/241 |
| 5,894,012 A * | 4/1999 | Denison ..................... 422/150 |
| 5,961,946 A | 10/1999 | Takegawa et al. |
| 5,977,421 A | 11/1999 | Hanson et al. |
| 6,039,774 A * | 3/2000 | McMullen et al. ........ 48/102 A |
| 6,133,499 A * | 10/2000 | Horizoe et al. .............. 588/208 |
| 6,149,881 A | 11/2000 | Hanson et al. |
| 6,221,329 B1 | 4/2001 | Faulkner et al. |
| 6,623,602 B1 * | 9/2003 | Bissell ........................ 201/25 |
| 6,657,095 B1 * | 12/2003 | Holden et al. ............... 585/241 |
| 6,736,940 B2 * | 5/2004 | Masemore et al. ........... 201/25 |
| 6,835,861 B2 * | 12/2004 | Nichols et al. .............. 585/241 |
| 2003/0114722 A1 * | 6/2003 | Bradley ..................... 585/241 |

* cited by examiner

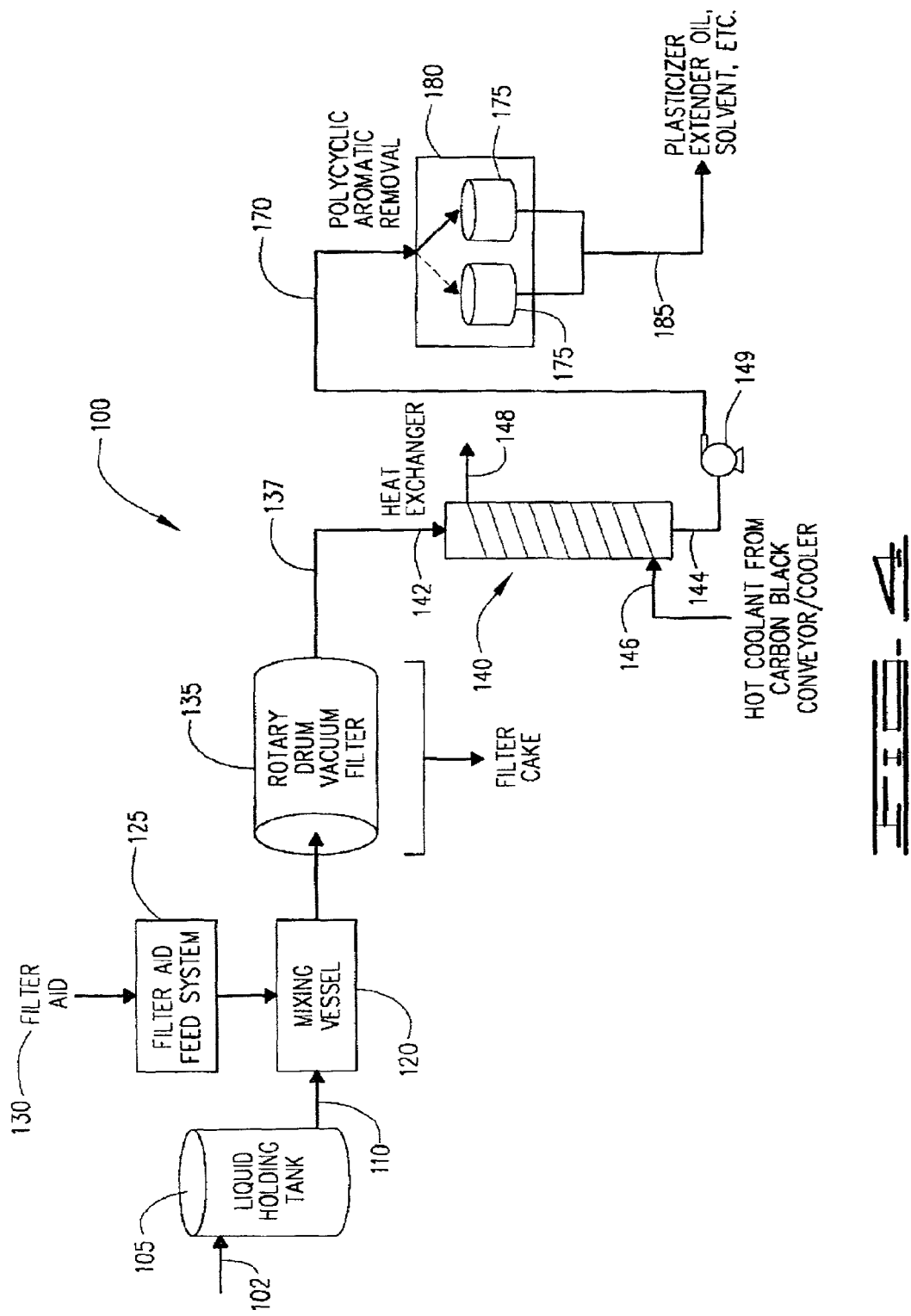

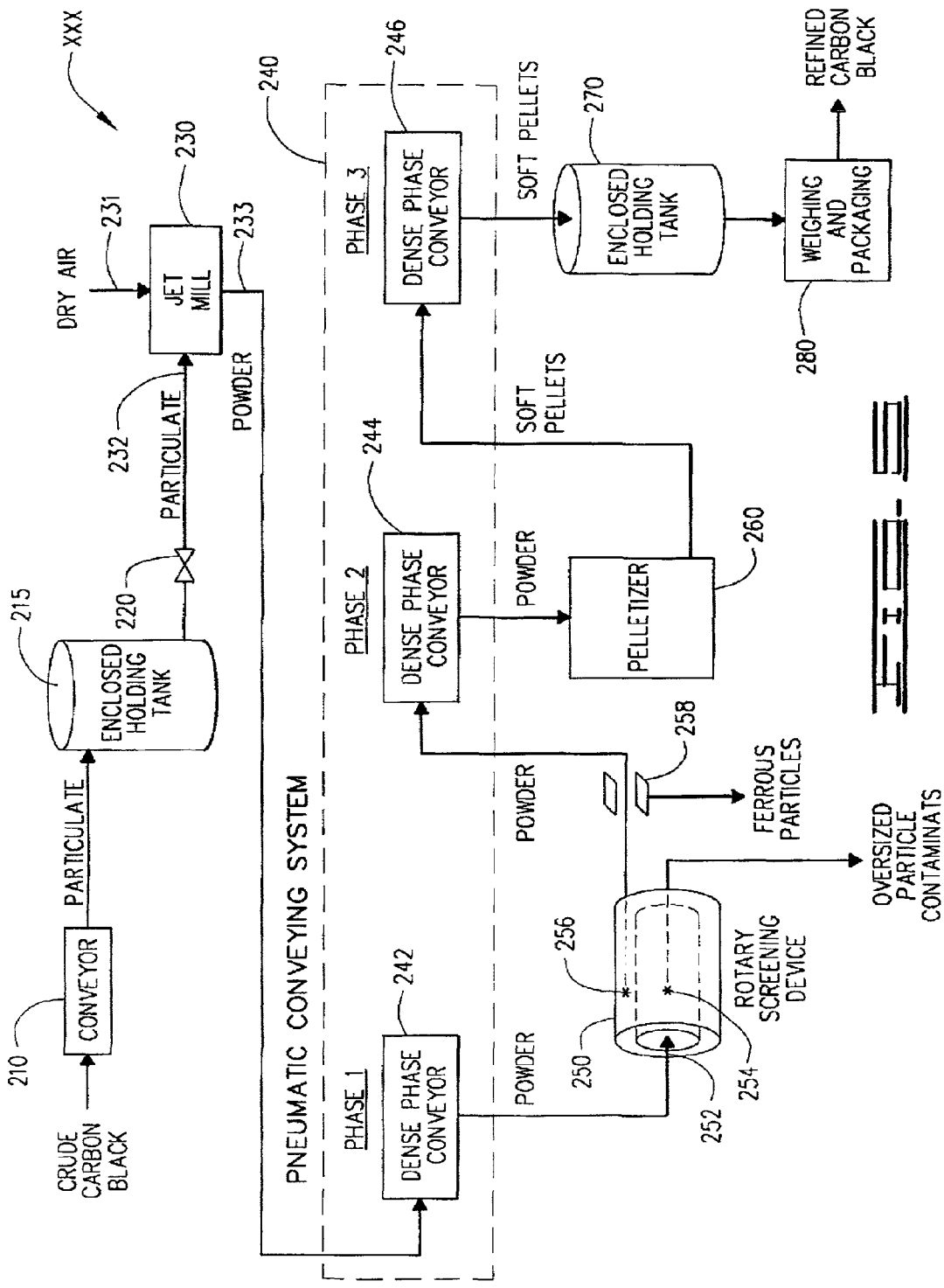

APPARATUS FOR RECOVERING MARKETABLE PRODUCTS FROM SCRAP RUBBER

CROSS-REFERENCES TO RELATED APPLICATIONS

This patent application claims the benefit of U.S. Provisional Application No. 60/236,519, filed Sep. 29, 2000, of the same or similar title.

BACKGROUND OF THE INVENTION

The present invention relates generally to methods and devices for pyrolyzing scrap materials having a high hydrocarbon content and for recovering marketable end products from the pyrolysis of these materials. More specifically, it relates to a system for pyrolyzing scrap rubber shreds and refining the pyrolysis by-products to produce high quality carbon black and plasticizer oil.

Modern society is producing ever increasing amounts of scrap materials having a high hydrocarbon content. Certain scrap material originates from commercial products that have generally been produced through industrial processes requiring hydrocarbon-containing natural resources which may be either renewable (such as forest products) or non-renewable, such as petroleum, oil, and coal. Disposal of such scrap materials presents a problem. They must either be dumped as landfill, put into the ocean, or decomposed/destroyed in some manner. Each of these alternatives presents its own problems; however, the latter solution has the advantage that the end products from such decomposition/destruction may have further commercial value which may justify the cost of the process economically. It is highly desirable to find a way in which to efficiently recover valuable materials from such scrap materials in order to reduce the environmental pollutants which result from their decomposition/destruction.

Scrap material of particular concern is the disposal of automobile tires. In the United States alone approximately 350 million tires are discarded annually. Most of these tires are quartered or shredded and the shreds are sent to land fills after being quartered or shredded. Such shreds constitute about two percent of solid waste in the United States and about 164 million cubic feet per year of land fill space. Moreover, since these shreds are composed of hydrocarbon materials and hydrocarbons are a principle source of energy, the buried tires represent over 90 million MMBTU's per year of wasted energy. An alternate method of disposing of scrap tires is to burn them. This does recover about one-third of the economic value in terms of carbon black and generated energy. However, this method of disposal is not efficient, and it produces environmental pollutants.

Unfortunately, the rubber from scrap tires cannot be recycled directly into the manufacture of new tires because of the different types of rubber involved. A small portion, about 15 percent, of the scrap tire rubber can be recycled as tire chips for use in various end products such as matting and road surface compositions. However, this disposal method is limited in the amount of scrap rubber that can be processed. It is also relatively expensive due to the amount of liquid nitrogen the chip recycling process requires.

Pyrolysis offers great promise for disposal of hydrocarbon-containing scrap materials generally and scrap tires in particular. Pyrolysis provides an efficient, cost effective method for processing large volumes of scrap rubber and recovering marketable end products. Conventional scrap rubber pyrolysis produces two end products. First, it produces a coarse and impure grade of carbon black requiring further processing before it can be reused. The impurities are generally the steel used in the tire carcass, sulfur used in the vulcanization of the rubber, some zinc, and other trace materials. Second, scrap rubber pyrolysis produces a pyrolysis gas having a heavier weight hydrocarbon fraction and a lighter weight hydrocarbon fraction. The heavier weight hydrocarbon fraction, which is condensed as a liquid from the pyrolysis gas, is a low grade oil suitable as fuel oil. The lighter weight hydrocarbon fraction remaining in a vapor state has little value and can typically be recycled back through the pyrolysis process as fuel for the burners; it can also be sold as fuel under certain special circumstances or simply flared to the atmosphere.

Pyrolysis of tire shreds presents several unique problems. First, the pyrolysis gas exiting from the pyrolysis system contains entrained carbon black particles which are difficult to remove during the condensation of the pyrolysis gas into its liquid and vapor fractions. Second, it is difficult to obtain a consistent hydrocarbon condensate composition when condensing the pyrolysis gas into its liquid and vapor fractions. Third, because carbon black has a high affinity for gasses, it frequently contains an excess of pyrolysis gas which is adsorbed while it is still in the pyrolysis system; this presents problems in the further refinement of the carbon black.

It can be seen that a generic model for a Hydrocarbon Recovery System can be considered as being composed of the following three subsystems: a Pyrolysis System, a Gas Processing System, and a Solids Processing System. The Pyrolysis System receives the hydrocarbon-containing material and breaks down the material into a hydrocarbon-containing pyrolysis gas and a solid by using of intense heat in the absence of oxygen. The system may include a input component for handling the input material and delivering it to the pyrolysis process components; it may also include a removal component for providing the pyrolysis gas and solids in a pre-processed form to other systems for further refinement. The Gas Processing System refines the liquid fraction of the pyrolysis gas to produce usable end products. The Solids Processing System refines the impure carbon black provided by the Pyrolysis System to produce a usable form of carbon black, depending upon the application. According to this model, it should be noted that the division of functions between the Gas/Solids Processing Systems and the Pyrolysis System removal component is highly dependent as a practical matter upon the allocation of functions between these two areas. This functional allocation can also depend upon the physical configuration of the components and how they are laid out within the facility.

The Hydrocarbon Recovery System can be generally characterized as a continuous system where the input materials are provided in a more or less continuous rate, rather than in batches, and the products are produced at a continuous rate. It is intended to process feed stocks composed of fairly homogeneous hydrocarbon materials, generally described as waste or scrap products. These feed stocks take the form of scrap rubber produced from used automobile tires which have been shredded; coal or shale having a high sulfur content coal and shale; or forest products such as tree bark, waste lumber, leaves, branches, etc. Ideally, the Hydrocarbon Recovery System will process such materials in an energy efficient, cost effective manner which is environmentally safe with regards to the marketable materials produced and the byproducts of the process, e.g. exhaust gases, pyrolysis vapor, heated coolants, removed contaminants, etc. Such a system will provide end products which are marketable, recoverable, and economical.

BRIEF SUMMARY OF THE INVENTION

According to the model described heretofore, the present invention provides a Hydrocarbon Recovery System for scrap rubber in the form of scrap tire shreds, which includes a Scrap Rubber Pyrolysis System, a Carbon Black Refinement and Purification System and a Plasticizer Oil Purification System. The Scrap Rubber Pyrolysis System produces a selected hydrocarbon condensate from the pyrolysis gas and a crude carbon black containing inorganic impurities but which is essentially free of adsorbed pyrolysis gas. The Carbon Black Refinement and Purification System mills and purifies the carbon black to produce a low structure furnace black. This low structure furnace black has a much greater market value than the low grade carbon black produced by conventional pyrolysis and has a variety of commercial applications including the production of inks and adhesives, for example. The Plasticizer Oil Purification and Refinement System produces a clear, colorless oil or "bright stock" which is marketable as a plasticizer and extender oil for rubber and plastic compounding processes. This plasticizer/extender oil has a considerably higher market value than the fuel grade oil produced by conventional pyrolysis methods.

It is thus an object of this invention to provide an improved Scrap Rubber Pyrolysis System for pyrolyzing scrap rubber provided from tire shreds.

It is a further object of this invention to provide an improved Scrap Rubber Pyrolysis System which provides pyrolysis gas which is essentially free of entrained carbon black particles.

It is a further object of this invention to provide an improved Plasticizer Oil Purification and Refinement System for the recovery of a selected hydrocarbon condensate fraction from pyrolysis gas for use as plasticizers and solvents.

It is a further object of this invention to provide an improved Plasticizer Oil Purification and Refinement System which provides an environmentally safe plasticizer/extender oil which is free of polycyclic aromatics.

It is a further object of this invention to provide an improved Carbon Black Purification and Refinement System for the production of high grade carbon black.

It is a further object of this invention to provide an improved Carbon Black Purification and Refinement System for the production of high grade carbon black in the form of soft pellets.

These and other objects of the invention may be more clearly seen from the detailed description of the preferred embodiment which follows.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and configurations shown. In the drawings, like numerals are used to indicate like elements throughout. In the drawings:

FIG. 4 presents a detailed block diagram of an embodiment of the Plasticizer Oil Purification and Refinement System showing its components and how they interact.

FIG. 5 presents a detailed block diagram of an embodiment of the Carbon Black Purification and Refinement System showing its components and how they interact.

DETAILED DESCRIPTION OF THE INVENTION

Figure 1:
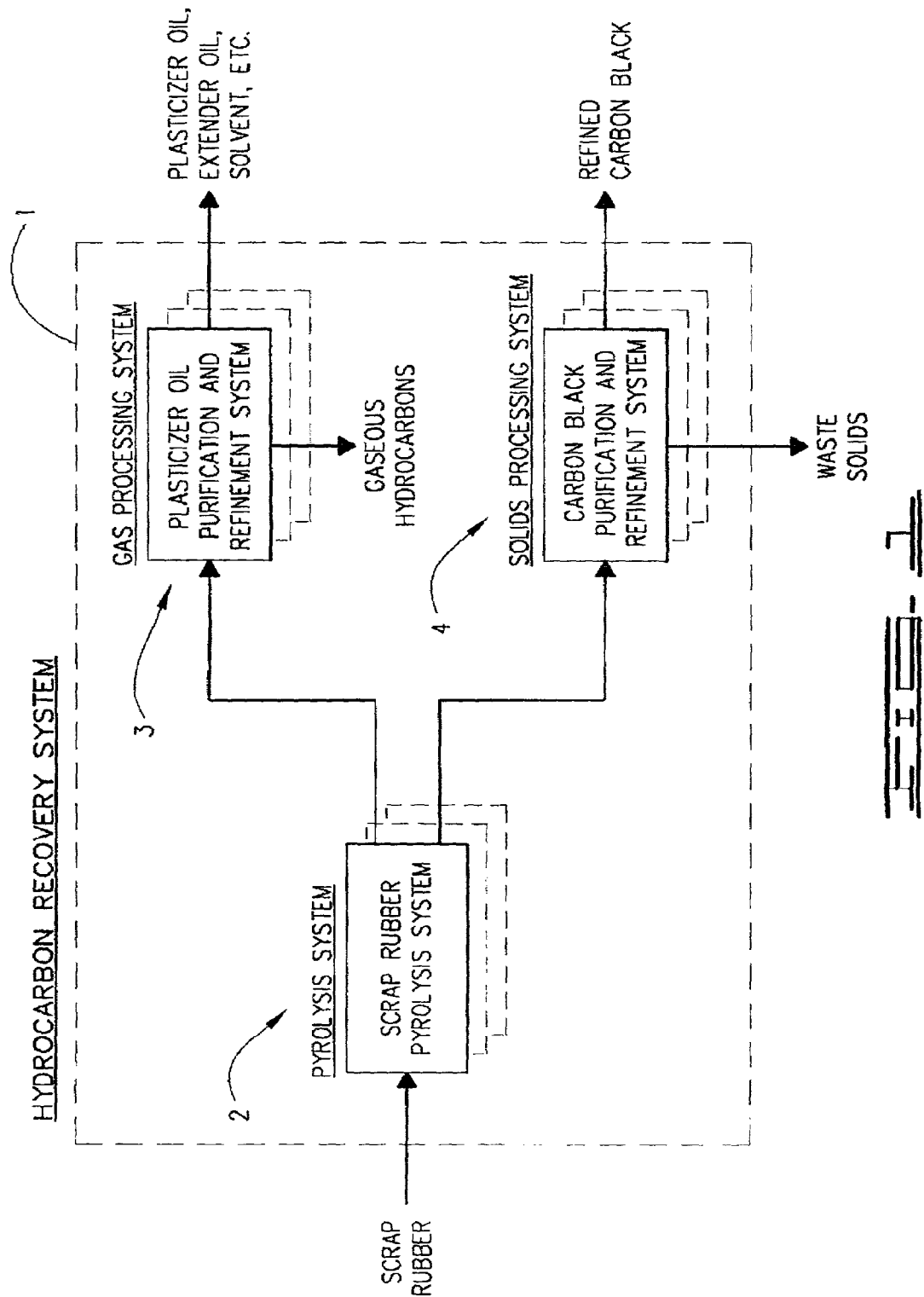
FIG. 1 presents a block diagram showing the generic model for a Hydrocarbon Recovery System with its three subsystems and their outputs.

The present invention is directed to a Scrap Rubber Recovery System for recovering marketable end products from scrap rubber. It consists of three subsystems. First, it includes a Scrap Rubber Pyrolysis System for breaking down a feed stock of tire shreds into its constituent parts, namely, a pyrolysis gas comprised of volatile hydrocarbons and granulated carbon black containing inorganic impurities without adsorbed pyrolysis gas. The pyrolysis gas is provided essentially free of entrained carbon black particles and is further broken down into a selected hydrocarbon condensate fraction and a vapor fraction. Second, it includes a Carbon Black Purification and Refinement System which further refines and purifies the granulated carbon black to produce a high grade of carbon black for use in inks, rubber products, and the like. Third, it includes a Plasticizer Oil Purification and Refinement System which further refines and purifies the hydrocarbon condensate to produce a high grade of plasticizer/extender oil, or "bright stock", from which has been removed polycyclic hydrocarbons which are considered to be environmentally hazardous.

A. Scrap Rubber Pyrolysis System

This system and method processes a feed stock, preferably consisting of waste products, having high hydrocarbon content by breaking it down into constituent parts consisting primarily of crude carbon black having inorganic contaminants and a pyrolysis gas comprising a mixture of volatile hydrocarbons. When the feed stock consists of scrap tire shreds, the desired end products consist of commercially marketable carbon black and plasticizer oil.

It has been found that a closed, steady state system is preferred to practice the pyrolysis process, meaning that a measured, metered input of raw material of known composition provided in the absence of oxygen is input to the system, a constant amount of heat is applied to the material under constant pressure conditions for a constant residence time, and the end materials are removed from the system at a constant rate, with the residence time and input rate of raw material chosen according to the volume of the reaction vessel. This is best accomplished by passing the material as a slowly moving bed through a pyrolysis vessel, with different parts of the bed at different stages of the overall pyrolysis process. No extraneous materials or end products are reintroduced back into the system since this would change the steady state composition of the system. It is essential to maintain an even temperature throughout the pyrolysis vessel by eliminating temperature gradients within the vessel. To establish the necessary beginning conditions for the maintenance of a steady state system, the system is purged with nitrogen and brought up to temperature before the input material is introduced.

Pyrolysis in general is the process of breaking down a hydrocarbon material in the absence of oxygen into its constituent parts, namely, forms of carbon and various hydrocarbon compounds having a broad range of molecular weights.

The percentage distribution of different hydrocarbon compounds depends upon the temperature at which they are produced, inasmuch as higher temperatures tend to result in a mixture having greater percentages of lower molecular weight hydrocarbon compounds and lower temperatures tend to result in a mixture having greater percentages of higher weight hydrocarbon compounds. This is due in part to the process known as "cracking", where high temperatures are used to decompose or break long hydrocarbon chains into shorter chains. It should be recognized that, if the pyrolysis temperature is sufficiently high, the pyrolysis temperature will directly affect the distribution of hydrocarbons within the resultant gas/liquid resulting therefrom.

Thus it can be seen that a judicious choice of pyrolysis temperature can result in not only the decomposition of a given feed stock but also in a predictable distribution of resultant hydrocarbon byproducts resulting from the pyrolyzation of that feed stock. For example, if the feed stock consists of shredded automobile tires, then the plasticizer oil used by the manufacturer to give the tires their elastometric qualities can be recovered for reuse since such plasticizer oil consists of a known percentage mixture of hydrocarbon products.

Efficient separation of these end products from one another has been heretofore difficult to achieve. When the feed stock is introduced into the pyrolysis reactor at the selected pyrolysis temperature, it is rapidly broken down into a pyrolysis gas comprised of volatile hydrocarbons and carbon black containing inorganic impurities. Since it is well known that carbon has an affinity for gases (as evidenced by the fact, for example, that activated charcoal is used in air filtration systems), the pyrolysis gas tends to adhere to the surface of the carbon black component of the solid end product by the process known as adsorption. When that end product is removed, it is thus contaminated with hydrocarbon compounds which must be removed in the subsequent refinement process. Such removal is costly, time consuming, and needlessly complicates the carbon refinement process. It is desirable to remove as much of these surface hydrocarbon compounds as possible before the carbonaceous material leaves the reactor.

Furthermore, the pyrolysis gas must be removed as an end product from the reactor as well. The flow of pyrolysis gas to the exit port of the reactor allows the gas to pick up carbon black particles which are thereby entrained within the exiting pyrolysis gas. These entrained particles tend to complicate and interfere with the proper operation of liquid filtration equipment and necessitate more frequent changes of filtration means. Removal of such carbon black particles is more easily performed while the pyrolysis gas is still in a gaseous state than when it is in a liquid state. The presence of entrained particles can thus needlessly complicate the refinement process for the pyrolysis gas. These entrained particles can be reduced in quantity by reducing or eliminating the agitation of the moving bed of material being pyrolyzed; by reducing the velocity of the exiting pyrolysis gas; or by removal of the particles while the pyrolysis gas is in a gaseous state. Preferably, all three methods are used.

The pyrolysis process employed by the invention enables the engineer to reliably predict the quantity and composition of the resultant hydrocarbon end products. As an added benefit, the carbon black end product contains little or no hydrocarbon residue on the surface of the carbon black particles, thus simplifying subsequent refinement processes for the carbon black. Such carbon black end products can be easily refined to produce carbon black of sufficient quality for direct reuse in automobile tires and other rubber products. With a different refinement method, this end product can be further purified and processed to produce toner black for use in copying machines and printers employing a xerographic process. The quality and composition of the end products produced by the Scrap Rubber Pyrolysis System must be consistent in order to design efficient industrial processes to efficiently purify and refine these end products.

To achieve the desired degree of predictability, the temperature within the pyrolysis vessel at which the feed stock is pyrolyzed must be constant with a permissible variation of ±0.1%. Furthermore, the entire pyrolysis process must achieve a steady state condition, which means the following:
    a. The feed stock is input at a constant feed rate;
    b. All materials must move through the pyrolysis vessel in a moving bed at a constant, controlled rate, so that all parts of the bed are exposed to the constant temperature for the same amount of time;
    c. The end products are removed from the pyrolysis vessel at a constant rate; and,
    d. No end products are reintroduced into the pyrolysis vessel for further processing.

The two end products, hydrocarbon gasses and carbon black, must be separated as completely as possible within the pyrolysis vessel; that is, the carbon black upon exit from the Scrap Rubber Pyrolysis System must have little or no hydrocarbon adhering to the surface of its particles.

These characteristics implemented by the present invention represent a surprising and nonobvious result over the prior art which has heretofore emphasized the use of multiple heating zones with different temperatures or special burner configurations to achieve a gradual increase/decrease in temperature over the length of the moving bed. It must also be recognized that the pyrolysis process described in the prior art actually consists of two separate and distinct steps: (1) the actual pyrolysis of the hydrocarbon feed stock into its two end products, carbon black containing inorganic contaminants and pyrolysis gas comprising volatile hydrocarbons; and (2) the complete separation of these two end products from one another to simplify subsequent refinement and purification of each end product.

The prior art teaches, either explicitly or by implication, that the pyrolysis process takes place during the entire residence time of the material within the reactor and that the final carbonaceous solids are removed only when pyrolysis is complete. The prior art also teaches, either explicity or by implication, that the moving bed must be agitated in order to thoroughly expose the feed stock and promote more complete pyrolysis. In actuality, pyrolysis takes place very rapidly during an initial time period (i.e. pyrolysis time) during which the feed stock is broken down into impure, granulated carbon black material containing inorganic impurities and volatile hydrocarbons in a gaseous phase. However, carbon black has a strong affinity for hydrocarbons, and a significant quantity of the hydrocarbons are adsorbed by the carbon black within the pyrolysis vessel. Over time, these adsorbed hydrocarbons must be desorbed in order to improve the quality of the final carbon black product (i.e. desorption time). It is this division of time between pyrolysis time and desorption time which has been unrecognized in the prior art. The adsorbed hydrocarbon is released by a sufficient residence time of the carbon black in a steady state environment having a constant temperature. Furthermore, carbon black particles are entrained in the hydrocarbon gas by agitation of the carbon black. Such entrained carbon black particles must be removed later in the process before efficient refinement of the hydrocarbon gas can take place. It is desirable to leave the carbon black undisturbed during its residence time, since nearly complete desorption will take place for a desorption time of sufficient duration. As a compromise, a system is required to gently move the carbon bed through the reaction zone without undue agitation of the carbon black so that entrained particles are reduced within the hydrocarbon gas while at the same time allowing the carbon black to desorb its adsorbed hydrocarbon gas component.

This important fact, i.e. the bifurcation of the residence time into a pyrolysis time and a desorption time, along with other features and innovations which shall become evident herein, is employed in the improved and efficient pyrolysis method and apparatus of the present invention. A steady state system allows the hydrocarbon compounds to be desorbed from the carbon black in the moving bed by retaining the solids within the reactor at the elevated temperature for a sufficient time period. Also, by gently moving the bed of feed stock through the reactor while at the same time reducing the velocity of the pyrolysis gas within the reactor so as not to disturb the surface of the moving bed, the amount of entrained solid material within the exiting pyrolysis gas is reduced to a small amount.

Figure 2:
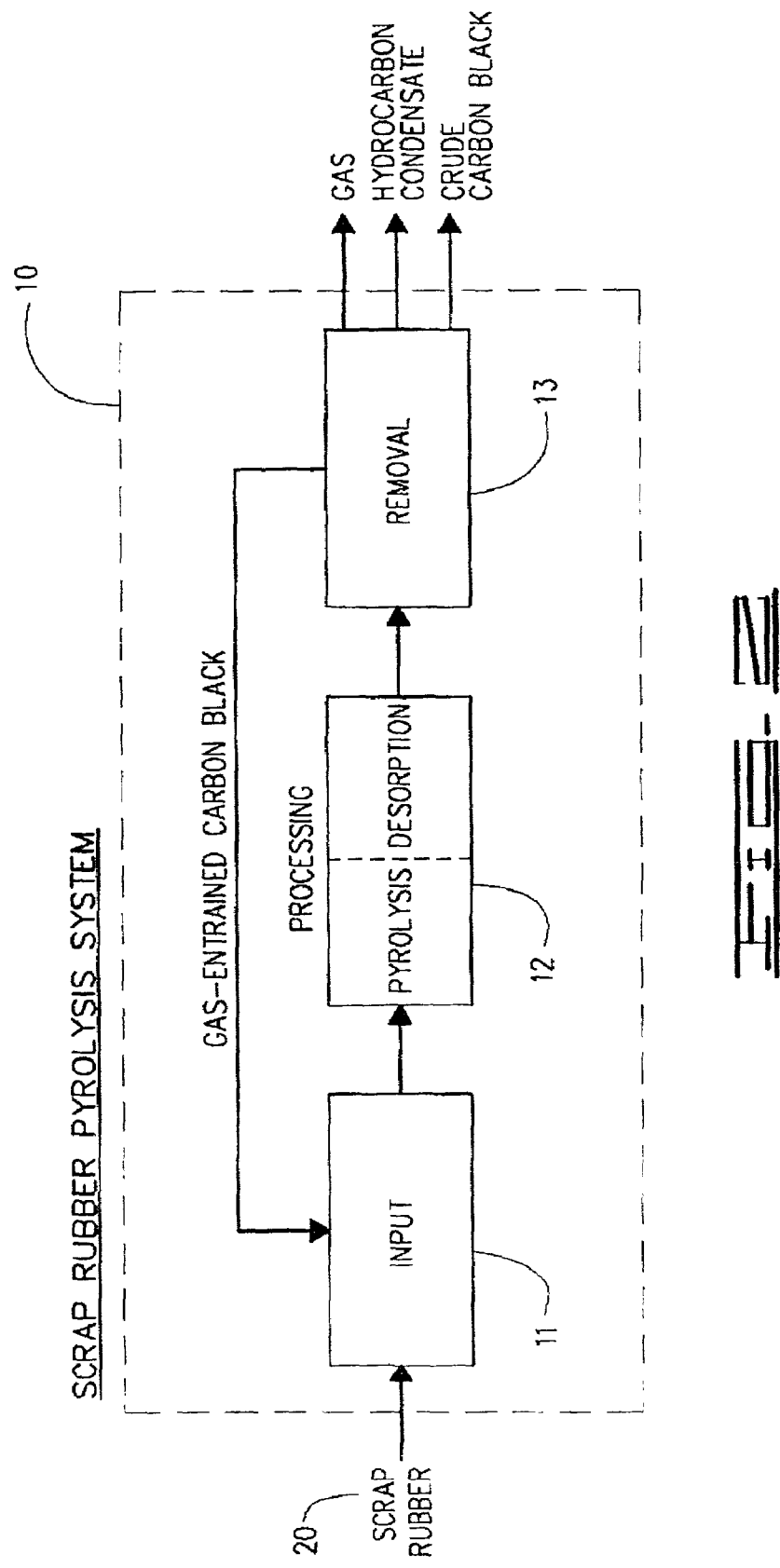
FIG. 2 presents a block diagram of the Scrap Rubber Pyrolysis System.

Referring now to the drawings in detail, FIG. 2 presents a block diagram of the Scrap Rubber Pyrolysis System 10, showing an input means 11, a processing means 12, and a removal means 13. The function of the input means 11 is to deliver scrap rubber 5 to the processing means at a controlled rate under conditions excluding oxygen therefrom. The processing means 12 functions to perform destructive distillation of the scrap rubber 5 and to thus decompose it into solids and gases. Processing means 12 is a steady state system having only one input, namely the scrap rubber 5 provided by the input means, and one output, namely the end products of the pyrolysis and desorption process. The removal means 13 functions to remove gross contaminants from the end products of the processing means to produce gas, hydrocarbon condensate, and crude carbon black. These outputs are in a form to allow them to be further refined by other systems in an efficient and cost-effective manner, depending upon the desired end product.

Figure 3:
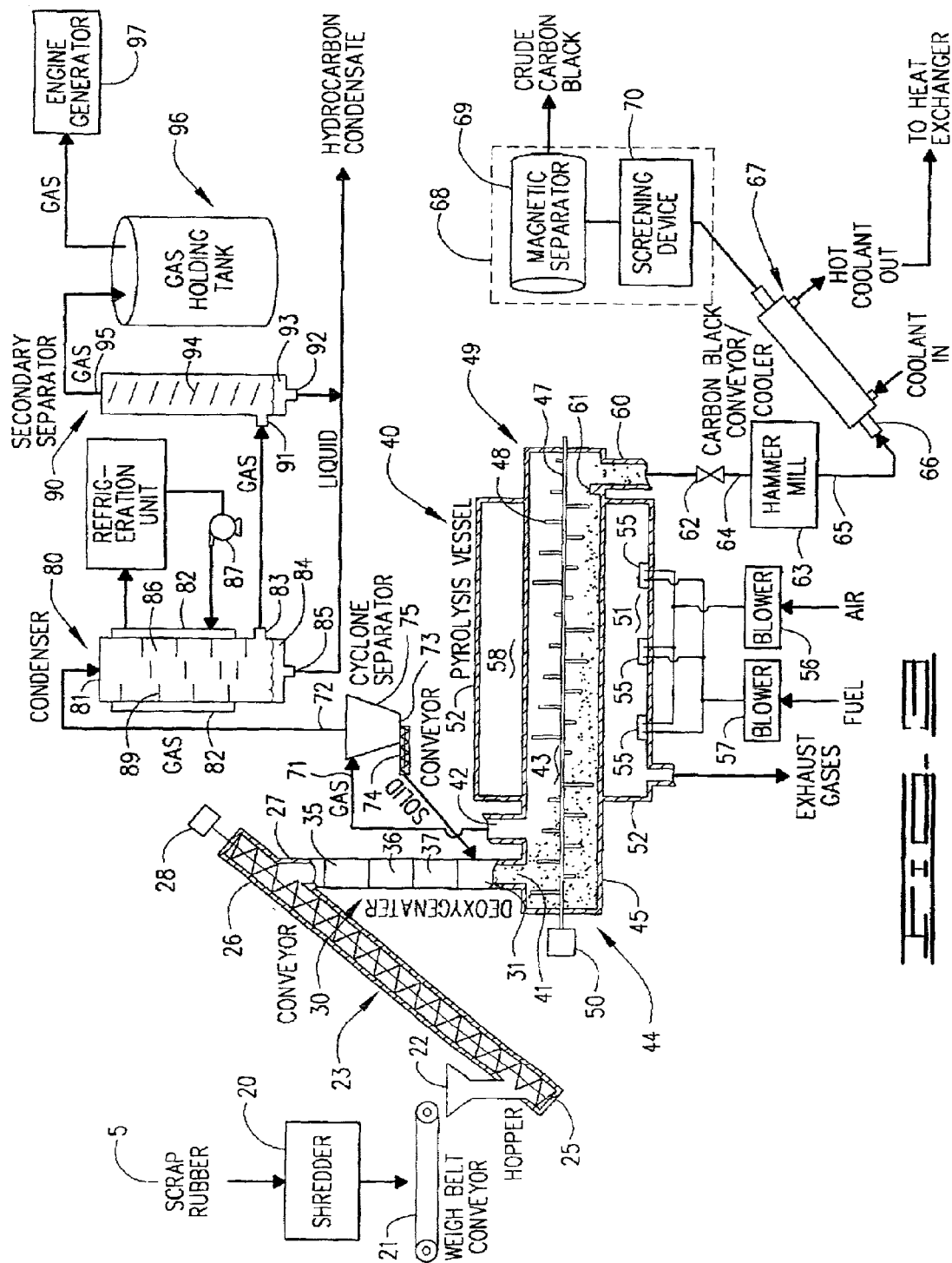
FIG. 3 presents a detailed block diagram of an embodiment of the Scrap Rubber Pyrolysis System showing its components and how they interact.

Referring now to the drawings in detail, FIG. 3 presents a schematic flow diagram of the components of the Scrap Rubber Pyrolysis System of the present invention. The flow of material through the system is generally from left to right and the outputs from the system are given on the right, according to the figure.

Scrap rubber 5 is provided to the system in the form of tire carcasses which are shredded, or comminuted, by shredder 20 which shreds the scrap rubber material into suitably sized fragments for pyrolysis. As used herein, the term "shredder" denotes any of a variety of size reduction devices which produces any shape of pieces of fragments. Similarly, the term "shred" denotes any size or shape of fragment which is acceptable by the Scrap Rubber Pyrolysis System. Preferably, shreds having a major dimension of about 2 inches are preferred. Oversized shreds may optionally be removed and fed back into shredder 20 to enhance uniformity of the shred size. For purposes of the invention, shreds may either be produced off site and delivered to the location of the system or else the shreds may be produced on site.

The shreds are introduced into the system by means of a weigh belt conveyor 21 which controls the rate at which shreds are delivered. The speed of weigh belt conveyor 21 is responsive to the weight of the shreds placed thereon to maintain a constant flow of shred mass. A hopper (not shown) may be employed to feed the shreds to weigh belt conveyor 21 by gravity to further promote uniformity of flow. A conveyor 23 receives the shreds from the weigh belt conveyor 21 at its input end 25 and delivers them at its output end 26 to the input end 27 of a deoxygenator 30. A hopper 22 may be used to funnel the shreds into conveyor 23. As shown in FIG. 3, conveyor 23 is in the form of an auger conveyor driven by motor 28. When horizontal floor space is at a premium, a bucket or flight conveyor is used instead of an auger conveyor to deliver shreds vertically from the weigh belt conveyor 21 to the input end 27 of deoxygenator 30. A hopper (not shown) at input end 27 may be employed to facilitate entry into deoxygenator 30.

Deoxygenator 30 receives shreds at its input end 27. It is designed to remove oxygen from the shreds by passing the shreds through a plurality of heated, non-jamming air locks 35, 36, and 37 vertically arranged so that the apparatus forms a gravity packed feed column. The air locks 35, 36, and 37 are separated by flap gates or sliding gates which open and close in sequenced manner to deliver the shreds to the output end 31 of deoxygenator 30 in a manner effectively excluding oxygen. A quantity of nitrogen is injected into the material in the middle air lock 36 to displace the lighter molecular weight oxygen. The nitrogen gas is injected at positive pressure to ensure that no oxygen leaks through incomplete seals within the deoxygenator 30.

The primary portion of the Scrap Rubber Processing System is the processing means for pyrolysis and desorption. The scrap rubber shreds are decomposed through the process of pyrolysis, or destructive distillation, into pyrolysis gas and crude carbon black end products. The pyrolysis gas is comprised of both light and heavy hydrocarbon volatiles. The lighter volatiles can be recycled as fuel for pyrolysis system, marketed as fuel grade gas in certain specialized applications, or flared to the atmosphere, whereas the heavier volatiles are condensed from the pyrolysis gas as useful products for remarketing, such as high grade plasticizer oil. The crude carbon black contains only inorganic impurities such as fiberglass fibers and metal fragments, as well as small amounts of sulfur and zinc compounds; all organic impurities such as nylon or polyester are decomposed by the pyrolysis process.

Pyrolysis vessel 40 is comprised of an inner pyrolysis chamber 43 defined by a elongate vessel 45. Elongate vessel 45 is a cylindrical container composed of stainless steel which has a high coefficient of heat transfer and is designed to withstand high temperatures for long periods of time. Alloys containing high percentages of chromium and molybdenum are preferred. The output end 31 of deoxygenator 30 is in direct communication with the interior pyrolysis chamber 43 through conduit 41.

A screw conveyor mounted axially inside elongate vessel 45 comprises a shaft 47 supporting appendages 48 arranged in a broken helix pattern thereon. The appendages may be spikes, paddles, blades, or some other elongate device of similar design. Shaft 47 rotates on sealed bearings (not shown) which prevent outside air from entering the vessel. As shown in the drawing, motor 50 provides the rotational motion for shaft 47; however, other means of providing rotational motion may be used without departing from the intent of the invention, such as chain drives and the like. The rotational rate provided by motor 50 controls the residence time of the moving bed within elongate vessel 45. The purpose of this screw conveyor is to move the bed of material from the input end 44 to the output end 49 of elongate vessel 45 as shaft 47 is rotated. Additionally, appendages 48 gently agitate the bed to expose all parts of the bed to the internal atmosphere in pyrolysis chamber 43 in order to promote desorption of pyrolysis gas from the solids in the bed and to prevent hot spots. Care must be taken to prevent excess particles from being entrained in the pyrolysis gas within the pyrolysis chamber 43 by too much movement of the bed. Agitation is not required or necessary but, as a practical matter, serves to allow shorter pyrolysis vessels and reduces the time required for the moving bed to traverse elongate vessel 45.

The heat for the pyrolysis reaction occurring in the inner pyrolysis chamber 51 is supplied by combustion which occurs inside a heating chamber 51 defined by a refractory lined furnace box 52 which surrounds the elongate vessel 45. The furnace box 52 is equipped with multiple burners 55 which burn fuel gas in the heating chamber 51. Burners 55 are designed to provide a constant temperature within the entire length of elongate vessel 45 by minimizing temperature gradients within the inner pyrolysis chamber 43. Environmental considerations dictate that the amounts of NOX emissions be minimized or eliminated. In order to eliminate such NOX emissions, an overabundance of air is supplied to the burners by means of blower 56. Because of velocity considerations, the fuel supplied to burners 55 is also supplied by means of a blower 57. The fuel/air mixture is adjusted so that the increased supply of oxygen to the flame cools its temperature to below 2000° F., below which NOX does not form. The resulting exhaust gases are thus free of NOX and can be released into the surrounding atmosphere as by a smoke. These exhaust gases are not suitable for use in other parts of the process. The high oxygen content of the exhaust gases make them unsuitable for purposes of pressurization in other portions of system, since the excess oxygen may cause hot solids to ignite. A thermocouple control mechanism (not shown) is used to automatically regulate the burners according to the internal temperature of pyrolysis chamber 43. It has been found that a thermocouple control mechanism has a number of advantages over the older infrared means for measuring temperature. First, the thermocouple provides more accurate temperature readings than infrared means. Second, it eliminates the requirement for a sight port in the wall of pyrolysis vessel 45. Third, it is easily integrated into modern digital control systems for automatic monitoring of system functions.

The crude carbon black resulting from pyrolyzation of shreds collects at the output end 49 of pyrolysis vessel 45. Carbon black output port 60 is located at the bottom of pyrolysis vessel 45 at its output end 49 to receive the crude carbon black as a gravity packed column. A rotary valve 62, also known as a "star valve", serves as both an air lock and a regulator for the removal of crude carbon black. Under control of a automated control system, the rotational rate of the rotary valve 62 can be controlled to deliver a constant flow of crude carbon black out of the pyrolysis vessel. Weir 61 encircles the upper end of carbon black output port 60 to further control the amount of crude carbon black falling therein.

The crude carbon black exiting pyrolysis vessel 45 is composed of varying sized clumps of carbon black, fiberglass strands, and other inorganic contaminants. Pulverizing these clumps immediately upon exit from pyrolysis vessel 45, rather than later in the process after cooling, has been found to have a number of benefits. First, the clumps can be reduced in size to particles which are relatively uniform. This enables other devices in the purification process to operate more efficiently without frequent cleaning or jamming. Second, breaking up the fiberglass strands which may have agglomerated ("birds nests") into smaller pieces prevents; such birds nests are known to cause auger-type conveyors to bind. Removing the possibility of birds nests allows the engineer to design a more efficient carbon black purification system. Third, pulverization increases the surface area of the total mass to promote more rapid cooling and to break free any gross contaminants which might be mechanically attached to the carbon black. A hammer mill 63 is provided with an inlet 64 in communication with carbon black output port 60 through rotary valve 62. The hammer mill 63 functions as a sizing means to break up any large pieces in the stream of crude carbon black and to reduce the stream to a smaller, more uniform particle size. All inorganic strands of fiberglass, steel, and other metals are broken up into much smaller pieces thereby, so that the problem of producing "birds nests" of fiberglass fibers is eliminated. This result has the unexpected design advantage that subsequent equipment can be designed more simply and efficiently since the birds nest problem is not a consideration.

The output 65 of hammer mill 63 is in direct communication with the input 66 of the carbon black conveyor/cooler 67. The conveyor/cooler 67 may be an auger or screw conveyor and preferably is surrounded by a cooling jacket containing a heat transfer fluid such as water or antifreeze which will cool the hot carbon black as it is conveyed therethrough. Conveyor/cooler 67 lowers the temperature of carbon black from the pyrolysis temperature to around 200° F. The cooled carbon black is then conducted through a conduit to a carbon black screening assembly 68 to remove oversized and ferrous contaminants from the cooled carbon black. The screening assembly 68 comprises a screening device 70 which separates and removes oversized fragments and gross contaminants, such as fiberglass filaments and larger bits of ferrous material, from the carbon black. The magnetic separator 69 separates and removes any ferrous contaminants such as metal particles which remain. It is of a drum type, such as the Grizzley EREIZ Mechanical Separator commonly sold by such companies as Eriz Magnetics, Erie, Pa. It should be noted that the order in which the screening device 70 and the magnetic separator 69 are applied to the carbon black is immaterial and could be in reverse order without departing from the spirit of the invention. Also, other mechanisms such as size metering devices or the like may be used in place of screening device 70 without departing from the spirit of the invention.

Pyrolysis gas generated by in the pyrolysis chamber 43 is removed from the chamber through the pyrolysis gas outlet conduit 42 located on the input end 44 of pyrolysis vessel 45 adjacent to conduit 41. Exiting pyrolysis gas is known to contain particulate matter consisting of carbon black particles. It is desirable to reduce the amount of entrained particles from the pyrolysis gas prior to purification since removal of particles from pyrolysis gas before its hydrocarbons are separated into lighter and heavier fractions is more economical than removal of particles from the condensed, heavier hydrocarbon fractions after separation. Hydrocarbon condensate containing carbon black particles forms sludge which collects on equipment interiors and must be laboriously removed. Reduction of entrained particles from gas can be accomplished by either preventing the gas from picking up particles initially or else removing particles once they have become entrained. To this end, three methods are used to reduce the density of entrained solids in the exiting pyrolysis gas: (1) minimal agitation of the moving bed while it is in the vessel, (2) reduction of velocity of the gas as it exits the vessel, and (3) physical removal of all particles possible before a fraction of the pyrolysis gas is condensed as a liquid.

The first method is implemented in the present invention by keeping the rotational speed of shaft 47 as low as possible. The second method is implemented by sizing the diameter of conduit 42 as large as practical to reduce velocity of exiting gas. It is a well known principle of physics that the velocity of a moving fluid increases exponentially as to the diameter of its conduit. Furthermore, the amount of light material that a moving gas will pick up, or entrain, when it is flowing over the surface of the light material is directly proportional to its velocity. Therefore, the velocity of the exiting pyrolysis gas can be reduced by keeping the diameter of conduit 42 as large as practical, depending upon the size of pyrolysis vessel 40.

Pyrolysis chamber 43 is in direct communication with inlet 71 of the centrifugal separation means 75 through conduit 42. Centrifugal separation means 75 removes entrained carbon black particles from the exiting pyrolysis gas. The advantages of removing such entrained particles in this manner are that (1) the particles are removed before the pyrolysis gas is condensed and thus eliminates the sludge problem in downline components of the purification process; (2) no filtering or packing material is necessary, thus eliminating the need to replace or clean filtering material; and (3) there is no sludge or tar buildup within the device itself since the pyrolysis gas is at a temperature higher than the boiling point of any volatile hydrocarbons present. This method has been shown to remove up to 98% of entrained particles from the pyrolysis gas.

The device used as the centrifugal separation means 75 in the present invention is a cyclone separator. Although well known in other areas of the art, it is believed that its use in this application has heretofore been unrecognized and represents a new and novel approach to the problem of separating entrained particles from pyrolysis gas. The cyclone separator is constructed as an inverted, truncated cone with the large diameter end directed upwardly and the small diameter end directed downwardly. The pyrolysis gas tangentially enters the top, or large diameter end, through input port 71 and the gas carrying the entrained particles is circumferentially directed around the interior of the cone. This change in direction changes the velocity of the entrained particles. This change in velocity allows gravity to pull the particles lower as they circle the interior until finally they lose sufficient energy to fall through the bottom port 73 at the small diameter end of the separator. The lighter pyrolysis gas is removed from port 72 at top of cyclone separator 75. Auger 74 removes the particles in a positive manner to ensure no buildup or jamming, and they are returned to the last air lock 37 of deoxygenator 30 where they merge with the entering shreds. This maintains the steady state condition of the pyrolysis vessel since the amount of particles leaving the system through entrainment within the pyrolysis gas equals the amount of particles entering the system.

The pyrolysis gas from output port 72 of cyclone separator 75 is directed to an oil/gas separator assembly which separates the pyrolysis gas into a heavier hydrocarbon fraction as a liquid, or oil, and a lighter hydrocarbon fraction which remains in a gaseous state and contains such hydrocarbons as methane, propane, butane, etc. After initial separation, the lighter hydrocarbon fraction is fed to a secondary separator to remove any heavier hydrocarbons which remain in the form of entrained droplets. The oil/gas separator assembly comprises a condenser 80, a secondary separator 90, and a gas holding tank 95.

Condenser 80 is configured as a vertical cylinder with baffles 89 arranged within the interior 86 and supporting internal cooling tubes (not shown). Heated pyrolysis gas is provided through gas inlet 81 at the top of condenser 80 where is flows downwardly through interior 86 as it cools. A fraction of the pyrolysis gas condenses to form a reservoir 84 of hydrocarbon condensate at the lower end of condenser 80. A liquid outlet port 85 is provided in the bottom of condenser 80 to drain the condensate away, and a gas outlet port 83 is provided at the lower end of the condenser to remove the lighter, gaseous hydrocarbon fraction. The level of reservoir 84 is maintained to be proximate with outlet port 83. A cooling jacket 82 contains external coils which are in heat transfer relation with the sides of condenser 80 and optionally with baffles 89 and the internal tubes. A heat transfer fluid is pumped through cooling jacket 82 by pump 87. The heat transfer fluid circulates through the cooling jacket 82 and internal cooling tubes to remove the heat from the heated pyrolysis gas, and then returns to a refrigeration unit 88 where it is cooled. The amount of heat transferred from the entering pyrolysis gas to the heat transfer fluid is controlled by controlling the rate at which pump 87 circulates the fluid.

The hot pyrolysis gas leaving the cyclone separator 75 through port 72 is directed to input port 81 of the condenser 80. As it flows downwardly, it loses heat and the heavier hydrocarbons with high boiling points begin to condense and fall into the condensate reservoir 84. The gas continues to lose heat until it reaches the bottom end of condenser 80 where cooled heat transfer fluid is entering the cooling jacket 82 at a selected temperature chosen according to the required composition of the hydrocarbon condensate. The cooled heat transfer fluid flows in counter-direction with the entering pyrolysis gas. In this way, the equilibrium between the condensate and vapor is maintained at the required temperature and the composition of the hydrocarbon condensate is kept consistent. The rate of heat transfer fluid flow maintains the temperature of the liquid/gas in the vicinity of the surface of reservoir 84 by increasing when the temperature rises and decreasing when the temperature falls; the temperature of the entering heat transfer fluid, however, is kept at a constant value. This method of condensing the heavier hydrocarbon condensate from the pyrolysis gas by precisely controlling heat transfer fluid flow rate and temperature is believed to be new and unique within this area of the art.

The hydrocarbon condensate collected in reservoir 84 is removed through liquid output port 85 and transferred to liquid holding tank 105 (FIG. 4) either in preparation for shipment elsewhere or further processing in the Plasticizer Oil Purification and Refinement System. The lighter gaseous hydrocarbon fraction is removed from condenser 80 through output port 83 after flowing over the surface of reservoir 84 and entraining droplets of the heavier hydrocarbon condensate. To remove this entrained condensate, the exiting gaseous hydrocarbon fraction is directed to secondary separator 90.

Secondary separator 90 is constructed at a vertical cylinder with a gas inlet 91 at the bottom end and gas outlet 95 at the top end. The bottom end of secondary separator 90 forms a reservoir 93 having a liquid outlet 92 at its lowest extent, for collecting hydrocarbon condensate. Baffles 94 are interposed in the path of the lighter hydrocarbon fraction as it enters gas inlet port 91 and flows upwardly around and through baffles 94 to exit through gas outlet 95. Baffles 94 are constructed as perforated plates through which passes the lighter hydrocarbon fraction. Entrained droplets are too large to pass through the holes and are thus removed from the lighter hydrocarbon fraction, where they fall into reservoir 92 at the bottom of secondary separator 90. The hydrocarbon condensate collected in reservoir 93 is removed through liquid output port 92 and transferred to liquid holding tank 105 (FIG. 4) either in preparation for shipment elsewhere or further processing in the Plasticizer Oil Purification and Refinement System.

The remaining gas composed of low boiling point hyrdocarbons is taken from the gas exit port 95 and sent to the gas holding tank 96. There it is accumulated for use in an engine generator 97 as shown, recycled to the burners 55, or sold as high BTU fuel gas in certain specialized situations, or flared to the atmosphere.

B. Plasticizer Oil Purification and Refinement System

With reference now to FIG. 4, the Plasticizer Oil Purification and Refinement System of the present invention will now described. The hydrocarbon condensate produced by the Scrap Rubber Pyrolysis System is known to have the properties required of a input to this system, although hydrocarbon liquids from any system can be input if they have the same general properties. The hydrocarbon condensate to be processed is transferred through conduit 102 and stored in liquid holding tank 105 to be processed. Liquid holding tank 105 may receive hydrocarbon condensate from several Scrap Rubber Pyrolysis Systems which may be within the same facility or from any combination of such pyrolysis systems in the same or different facilities. This tank also serves as a surge tank in case of a temporary shut down in production.

The hydrocarbon condensate is transferred to a mixing vessel 120 through conduit 110. This mixing vessel is adapted to mix the hydrocarbon condensate with a filter aid 130 under conditions which permit the filter aid 130 to attract contaminants in the condensate. The mixing vessel 120 is equipped with a propeller type agitator device; however, any suitable means for agitation is acceptable. For automatic, regulated feed of filter aid 130 into mixing vessel 120, a filter aid feed system 125 is used to hold filter aid 130 and weigh and dispenses the filter aid 130 at a selected rate to the mixing vessel 120 as by gravity. The contaminants sought to be removed from the condensate by the filter aid include any suspended carbon black particles which may remain within the mixture; a preferred filter aid for this purpose is diatomaceous earth, and most preferably kieselguhr. The suspended particles and the filter aid form aggregates which remain as a solid in the solution.

Once the filter aid and the contaminants have formed aggregates, the hydrocarbon condensate containing the aggregates is delivered by a pump (not shown) through a conduit to a filter aid removal assembly 135 for the removal of the aggregates. The preferred device for this purpose is a rotary drum vacuum filter which comprises a filter, vacuum pump and condenser. The vacuum pump draws the hydrocarbon condensate into the interior of the device, thus straining the filter aid through a cylindrical, rotating filter media. A scraping blade positioned above a collection container scrapes the aggregate, or filter cake, from the outside of the rotating cylinder where it falls into the collection container for later removal. The filter cake can be disposed of in a municipal solid waste land fill.

The filtered hydrocarbon condensate passes through a conduit 137 into heat exchanger 140 where it is heated in preparation for removal of polycyclic aromatics. Heat exchanger 140 has a standard shell-and-tube construction. It receives the relatively cool hydrocarbon condensate at inlet 142, so that it passes through heat exchanger 140 and exits through outlet 144. The heat transfer fluid from the carbon black conveyor/cooler 67 having a temperature ranging from 300° F. to 400° F. is received at coolant inlet 146 where it passes through coils to heat the entering hydrocarbon condensate, and then returns to the carbon black conveyor/cooler 67. The hydrocarbon condensate is heated to a point where the heavier hydrocarbons therein are almost vaporized; the lighter hydrocarbons are already vaporized in the heat exchanger. This process lowers the viscosity of the oil and promotes better filtration.

The heated hydrocarbon condensate is pumped by pump 149 through conduit 170 to polycyclic aromatic removal assembly 180, comprising a plurality of carbon filtration canisters 175, each containing activated charcoal; outlet 185 for a heated plasticizer oil end product; and a sensing means for sensing the differential pressure between the input side and the output side of the carbon filtration canisters 175. Polycyclic aromatic removal assembly 180 removes colloidal contaminants, color bodies, and polycyclic hydrocarbons from the heated hydrocarbon condensate. An activated carbon filter is preferred. In most cases, the carbon filtration canisters will comprise a dual canister system in which the canisters alternate between a stand-by mode and a filtering mode so that continuous filtering can be maintained. The heated hydrocarbon condensate is pumped by pump 149 under pressure through the canisters. The sensing means monitors the differential pressure on the active carbon filtration canister; when the pressure exceeds a threshold value to indicate that the canister has reached its capacity, a signal is generated to either automatically switch to the unused canister or else set an alarm for maintenance personnel to perform the switching action. It has been found that heated hydrocarbon condensate has a lower viscosity which promotes better flow through the activated carbon canisters. Polycyclic aromatics are also known carcinogenic agents, and their removal by the polycyclic aromatic removal assembly 180 enables the system to meet governmental regulations for emissions and handling of hazardous substances. Finally, the polycyclic aromatics are the source of color in the hydrocarbon condensate, so that their removal also results in a clear, colorless plasticizer oil which has high market value. The hot plasticizer oil leaving outlet 185 is sent to a final cooler or condenser (not shown) to cool the end product down to a point where it can be safely handled.

The clear, colorless plasticizer oil leaving final cooler may be pumped into a storage facility from which it can be pumped into tank trucks or drums for sale. It will be noted that plasticizer oil is a solvent with a moderate flash point; thus, the purified oil should be stored in a facility which is physically separate and removed from the Scrap Rubber Pyrolysis System. The purified plasticizer/extender oil produced by this system compares favorably to that produced by other conventional pyrolysis systems. The purified oil has a lower viscosity. Suspended solids are eliminated and virtually all color is removed, producing an oil characterized by water white color and clarity. This "bright stock" has a market value substantially greater than fuel oil. Table 1 lists a set of measured characteristics of the plasticizer oil produced by the invention. The plasticizer oil meets specifications of ASTM 104A of the American Society for Testing Materials, i.e. composed of maximum of 20% aromatics, less than 20% paraffinic content, and remainder napthenics

TABLE 1

| ASTM Test Method | Property | Value |
| --- | --- | --- |
| D-287 | API Gravity | 26 (Typical) |
| — | Density, lb./gal. | 7.5 |
| D-2161 | Viscosity, SSU (100° F.) | 120 (Typical) |
| D-2161 | Viscosity, SSU (210° F.) | 40 (Typical) |
| D-92 | Flash Point, COC | 330° F. (Typical) |
| D-97 | Pour Point | −33° F. (Typical) |
| D-1500 | Color | <0.5 |
| D-611 | Aniline Point | 169° F. (Typical) |
| D-312D | Sulfur, Wt. % | 0.1 (Typical) |
| D-2007 | Aromatics, Wt. % | 21.5% (Typical) |
| D-2007 | Saturates, Wt. % | 78+ (Typical) |

C. Carbon Black Purification and Refinement System

The Carbon Black Purification and Refinement System purifies and refines the crude granulated carbon black containing inorganic contaminants as provided by the Scrap Rubber Pyrolysis System. Any crude carbon black product having characteristics generally similar the that produced by the invention can also be received by the system as well. The resulting end product is a carbon black having a structure similar to low structure furnace black of grade N326. Such furnace black is suitable for use in inks and adhesives, molded rubber and plastic formulations, paints and other coatings. The preferred embodiment for this system is shown schematically in FIG. 5, to which reference is now made.

The crude carbon black provided by the Scrap Rubber Pyrolysis System of the invention is transferred therefrom by means of conveyor 210 which delivers the crude carbon black to an enclosed carbon black holding tank 215. Conveyor 210 is preferably an auger-type conveyor which is enclosed to reduce dust and debris and also to promote safety. It should be noted that holding tank 215 may receive crude carbon black streams from a plurality of Scrap Rubber Pyrolysis Systems which may be resident at the same site or at different sites. In addition, holding tank 215 serves as a surge tank to allow temporary shutdown of either system.

From holding tank 210, the carbon black is metered for a constant continuous delivery by rotary valve 220 to the inlet 232 of mill 230. This mill is chosen to receive particulate matter and to reduce the size of the carbon black particles therein to a selected average size. For example, the average size of the aggregates of granular carbon black produced by the Scrap Rubber Pyrolysis System may be about 60 to 80 mesh (about 0.007-0.010 inch). The mill is selected to reduce the average aggregate size to less than about 325 mesh (about 0.001 inch). An air powered fluid energy jet mill assembly is preferred as jet mills are capable of producing very fine powders, and air is received through air inlet 231. It has been found that a 100 psi air stream with dry air having a dew point of $-50°$ F. or lower is preferred. This is due to the fact that carbon black powder has strong tendency to agglomerate in the presence of moisture and the use of dry air prevents agglomeration problems later in the system. An air-powered fluid energy jet mill assembly is preferred. A suitable jet mill is a JET PULVERIZER brand marketed by The Jet Pulverizer Company (Moorestown, N.J.).

Once pulverized, the carbon black powder can be efficiently handled by a pneumatic conveying system which moves the carbon black powder in discrete portions, i.e. slugs, between the subsequent processing components. The movement of the slugs between components is accomplished by using compressed aire from a common source. The conveyor employed can be best described as a three stage, dense phase conveyor system as produced several companies, such as Dynamic Air® Conveying Systems, St. Paul, Minn. The three conveyor phases for purposes of describing the remainder of the Carbon Black Purification and Refinement System are as follows:

(1) phase one—conveyor between the jet mill 230 and rotary screening device 250
(2) phase two—conveyor between rotary screening device 250 and pelletizer 260; and,
(3) phase three—conveyor between pelletizer 260 and carbon black storage tank 270.

The phase one conveyor 242 conveys the milled carbon black powder from outlet 233 of jet mill 230 to final screening assembly comprising a screening device adapted to removed oversized particulate contaminants, such as fiberglass and silicon dioxide, and a magnetic separator 258 for removing any remaining ferrous particles. The preferred rotary screening device is a rotary screening device, such as the Centrisifter produced by Kason Corporation, as modified to utilize a 325 mesh. The milled carbon black powder enters inlet 252 of rotary screening device 250. The oversized particulate contaminants captured in the interior 254 of the rotary screening device as the finer carbon black powder is allowed to pass through the 325 mesh screen to the exterior 256. These oversized particulate contaminants, may be disposed of at any solid waste non-hazardous land fill. The milled carbon black powder also is processed for the removal of fine ferrous particles which were not removed in the gross screening assembly in the pyrolysis system. A magnetic separator 258 is used as a final attempt to remove any ferrous particles such as iron, nickel and cobalt particles which remain. Various reliable magnetic separators are commercially available and are generally configured as a pair of ceramic plates on either side of the carbon black stream. The ferrous particles removed by magnetic separator 258 are easily collected on a regular basis, i.e. daily, and discarded. The order in which the carbon black powder is thus purified by the rotary screening device 250 and magnetic separator 258 is not relevant and can be in reverse order without departing from the spirit of the invention.

The phase two conveyor 244 conveys the screened and milled carbon black powder from the magnetic separator 258 to a pelletizer 260, comprising an enclosed holding tank and a pelletizing device for forming compressed pellets of carbon black without a binder, i.e. "soft pellets". The pelletizing step reduces dust problems in shipment but is an optional part of the overall process. Any standard device known to the industry could be used; preferred is a device of a type made by Feeco International or Ferro-Tech.

The phase three conveyor 246 then conveys the soft pellets of carbon black powder from the pelletizer 260 to an enclosed carbon black storage tank 270. A weighing and packaging assembly 280 may be included for receiving the carbon black pellets from the storage vessel and automatically packaging the pellets for market in preselected amounts. Optionally, if the pelletizer is not implemented and carbon black powder is produced, then the weighing and packaging assembly 280 receives carbon black powder from the storage tank 270 and automatically packages the powder, such as 50 and 100 pound bags or large containers.

Because the milling, separating, and conveying equipment employed in this system is completely enclosed, no airborne carbon black contaminants are generated. Thus, a dust collection system is not usually necessary.

The milled and purified carbon black produced by this system compares favorably to carbon black produced by other systems. This milled, purified carbon black has a lower tar content and exhibits a lower heat loss factor at 105° C. The ash content is reduced primarily due to the more efficient removal of fiberglass and silicon dioxide particles, and the percentage of fixed carbon is greater. Table 2 gives the typical values found in the carbon black powder produced by this system.

TABLE 2

| ASTM Test Method | Property | Value |
| --- | --- | --- |
| D1510 | Iodine Absorption No | 67± mg/gm |
| D2414 | DBP Absorption No | 80± cc/100 gm |
| D1618 | Solvent Discoloration | 80% Transmittance (Min.) |
| D1506 | Ash Content | 1.0% (Max.) |
| — | Zinc Oxide Content | 7.5% (Typical) |
| — | Sulfur Content | 2.2% (Typical) |
| D1509 | Heating Loss | 0.2% (Max.) |
| D1513 | Pour Density | 26 ± 2 lb./ft$^3$ |
| D1514 | Sieve Residue: | |
| | U.S. No. 35 | 1 ppm (Max.) |
| | U.S. No. 325 | 10 ppm (Max.) |
| D1508 | Fines Content (U.S. No. 120): | |

TABLE 2-continued

| ASTM Test Method | Property | Value |
|---|---|---|
| | Bulk | 7% (Max.) |
| | Bags | 12% (Max.) |
| D3192 | Vulcanizate Purpoerties: (vs. IRB#6) | |
| | 300% Modulus (30'), psi | |
| | Tensile @ Break (30'), psi | −250 (Typical) |
| | Elongation @ Break (30'), psi | +300 (Typical) |
| | | +20 (Typical) |
| | Tint Strength Test (similar to ASTM D3265)* | 100 (Typical) |

*Developed by MONOCHEM Corp.

While only a preferred embodiment has been illustrated and described, obvious modifications may be made within the scope of this invention as described without substantially changing its functions. Accordingly, the scope of the invention should be determined not by the embodiments illustrated but by the functions they perform and their legal equivalents.

The invention claimed is:

1. A system for processing scrap rubber to produce marketable end products, the system comprising:
   a. a scrap rubber pyrolysis system, comprising:
      i. a pyrolysis vessel receiving rubber shreds into a heating zone within the vessel and passing the rubber shreds as a bed through the heating zone under a constant temperature condition so that each portion of the bed remains within the heating zone for a constant residence time of sufficient duration to allow for complete pyrolysis of the shreds into carbon black and pyrolysis gas and to allow for desorption of the pyrolysis gas from the surface of the carbon black;
      ii. a centrifugal separation means for receiving the pyrolysis gas from the pyrolysis vessel and removing entrained carbon black particles from the pyrolysis gas; and
      iii. a condensate separation assembly receiving pyrolysis gas from the centrifugal separation means, the condensate separation assembly comprising
         a condenser receiving pyrolysis gas from the centrifugal separation means, the condenser arranged to condense the pyrolysis gas into a hydrocarbon condensate fraction in a liquid phase collected in a reservoir at a lower end of the condenser and a vapor fraction in a gas phase, wherein the vapor fraction contains entrained hydrocarbon condensate droplets, and the hydrocarbon condensate fraction has a selected composition determined by a selected equilibrium temperature maintained at a surface of the reservoir; and
         a secondary separator receiving the vapor fraction and removing the entrained hydrocarbon condensate droplets;
   b. a plasticizer oil purification system comprising:
      i. a mixing vessel receiving hydrocarbon condensate and mixing the hydrocarbon condensate with a filter aid under conditions which aggregates of particulate contaminants in the hydrocarbon condensate and the filter aid are formed;
      ii. a filter aid removal assembly for removing the aggregates of filter aid and contaminants from the hydrocarbon condensate received from the mixing vessel;
      iii. a polycyclic aromatic removal assembly receiving the hydrocarbon condensate from the filter aid removal assembly and removing polycyclic aromatics from the hydrocarbon condensate; and
   c. A carbon black purification and refinement system comprising:
      i. a jet mill for milling the carbon black into particles of a selected average size in the presence of dry air;
      ii. a carbon black screening assembly adapted to separate oversized contaminants from the milled carbon black; and
      iii. a magnetic separator adapted to remove ferrous particles from the milled carbon black.

2. The system of claim 1 wherein the centrifugal separation means receiving the pyrolysis gas accelerates the entrained carbon black particles therein and allows the carbon black particles to be removed from the pyrolysis gas by means of gravity.

3. The system of claim 1, wherein the centrifugal separation means is a cyclone separator.

4. The system of claim 1 wherein the pyrolysis vessel further comprises a heating jacket and a plurality of burners within the heating jacket, fuel to the burners being supplied by a first blower, air to the burners being supplied by a second blower, wherein an overabundance of air is supplied to the burners to reduce the temperature of the burner flame to less than 2000° F.

5. The system of claim 1, wherein the condenser is comprised of
   a condensing section having baffles and a pyrolysis gas line for receiving the pyrolysis gas, the pyrolysis gas directed across and over the baffles which are interposed within the flow path of the pyrolysis gas, the condensing section also having a reservoir for collection of hydrocarbon condensate and a condensate line for draining the hydrocarbon condensate from the reservoir, the condensing section also having a vapor line for providing vapor containing entrained condensate droplets;
   a cooling section with a circulating heat transfer fluid, the cooling section disposed to encourage heat transfer between the pyrolysis gas and the heat transfer fluid;
   a sensing means disposed to measure the equilibrium temperature at the surface of the reservoir;
   a refrigeration unit receiving heat transfer fluid from the cooling section and sending the heat transfer fluid to the cooling section at a selected fluid temperature; and,
   a pump maintaining a flow rate of heat transfer fluid through the cooling section responsive to the equilibrium temperature, wherein the flow rate varies to maintain the hydrocarbon condensate fraction and vapor fraction at the selected equilibrium temperature while they are in equilibrium at the surface of the reservoir.

6. The system of claim 1 herein the carbon black screening assembly comprises:
   an oscillating fine screening deck for separating oversized contaminant particles from carbon black received from the pyrolysis vessel; and,
   a magnetic separator for separating ferrous particles from carbon black received from the pyrolysis vessel.

7. The system of claim 1 wherein the filter aid removal assembly comprises a rotary drum vacuum filter.

8. The system of claim 7 wherein the rotary drum vacuum filter comprises a rotary drum with an outer surface and a scraping blade disposed along the outer surface to scrape aggregates from the surface as the rotary drum rotates.

9. The system of claim 1 wherein the polycyclic aromatic removal assembly comprises activated carbon.

10. The system of claim 1 wherein the hydrocarbon condensate is heated prior to presentation to the polycyclic aromatic removal assembly.

11. The system of claim 1 wherein the screening device in the carbon black purification and refinement system comprises a rotary screening separator.

12. The system of claim 11 wherein the rotary screening separator contains a 325 mesh screen.

13. A system for condensing pyrolysis gas obtained from a scrap rubber pyrolysis system, the system for condensing pyrolysis gas comprising:

a cyclone separator receiving the pyrolysis gas, wherein the cyclone separator removes entrained carbon black from the pyrolysis gas;

a condenser receiving pyrolysis gas from the cyclone separator, the condenser arranged to condense the pyrolysis gas into a hydrocarbon condensate fraction in a liquid phase collected in a reservoir at a lower end of the condenser and a vapor fraction in a gas phase, wherein the vapor fraction contains entrained droplets of hydrocarbon condensate, and the hydrocarbon condensate fraction has a selected composition determined by a selected equilibrium temperature maintained at a surface of the reservoir;

a secondary separator receiving the vapor fraction and removing the entrained droplets of hydrocarbon condensate;

a mixing vessel receiving the hydrocarbon condensate and mixing the hydrocarbon condensate with a filter aid under conditions which permit particulate contaminants in the hydrocarbon condensate to form aggregates with the filter aid;

a filter aid removal assembly for removing the aggregates of filter aid and contaminants from the hydrocarbon condensate received from the mixing vessel;

a means for heating the hydrocarbon condensate received from the filter air removal assembly; and, a polycyclic aromatic removal assembly adapted to receive the heated pyrolysis oil from the filter aid removal assembly and to remove polycyclic aromatic contaminants from the pyrolysis oil.

14. The system of claim 13 wherein the polycyclic aromatic removal assembly comprises activated carbon.

15. The system of claim 13 wherein the filter aid removal assembly comprises a rotary drum vacuum filter.

16. The system of claim 13, wherein the condenser is comprised of a condensing section having baffles and a pyrolysis gas line for receiving the pyrolysis gas, the pyrolysis gas directed across and over the baffles which are interposed within the flow path of the pyrolysis gas, the condensing section also having a reservoir for collection of hydrocarbon condensate and a condensate line for draining the hydrocarbon condensate from the reservoir, the condensing section also having a vapor line for providing vapor containing entrained condensate droplets;

a cooling section with a circulating heat transfer fluid, the cooling section disposed to encourage heat transfer between the pyrolysis gas and the heat transfer fluid;

a sensing means disposed to measure the equilibrium temperature at the surface of the reservoir;

a refrigeration unit receiving heat transfer fluid from the cooling section and sending the heat transfer fluid to the cooling section at a selected fluid temperature; and, a pump maintaining a flow rate of heat transfer fluid through the cooling section responsive to the equilibrium temperature, wherein the flow rate varies to maintain the hydrocarbon condensate fraction and vapor fraction at the selected equilibrium temperature while they are in equilibrium at the surface of the reservoir.

* * * * *